United States Patent
Chen et al.

(10) Patent No.: US 11,800,072 B2
(45) Date of Patent: Oct. 24, 2023

(54) PROJECTION SYSTEM AND PROJECTION METHOD

(71) Applicant: Coretronic Corporation, Hsin-Chu (TW)

(72) Inventors: Yun-Shih Chen, Hsin-Chu (TW); Yu-Hsuan Hsieh, Hsin-chu (TW); Po-Yen Wu, Hsin-chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/873,162

(22) Filed: Jul. 26, 2022

(65) Prior Publication Data
US 2023/0057458 A1 Feb. 23, 2023

(30) Foreign Application Priority Data
Aug. 19, 2021 (CN) .......................... 202110954117.3

(51) Int. Cl.
*H04N 9/31* (2006.01)

(52) U.S. Cl.
CPC ........... *H04N 9/3179* (2013.01); *H04N 9/312* (2013.01)

(58) Field of Classification Search
CPC ...... H04N 9/31; H04N 9/3179; H04N 9/3108; H04N 9/312

USPC ................................. 348/744, 759, 770, 771
See application file for complete search history.

(56) References Cited

U.S. PATENT DOCUMENTS

| | | | |
|---|---|---|---|
| 11,128,844 B2 * | 9/2021 | Su ........................ | H04N 9/3179 |
| 2007/0063996 A1 * | 3/2007 | Childers .............. | H04N 9/3155 |
| | | | 345/204 |
| 2020/0099900 A1 | 3/2020 | Su et al. | |
| 2021/0306593 A1 * | 9/2021 | Cheng .................. | H04N 9/3179 |

FOREIGN PATENT DOCUMENTS

TW    I574150    3/2017

* cited by examiner

Primary Examiner — Sherrie Hsia
(74) Attorney, Agent, or Firm — JCIPRNET

(57) ABSTRACT

A projection system and a projection method are provided. The projection system includes a digital micromirror device, a digital light processing chip, and a display processing chip. The display processing chip receives a first image signal with a variable frame rate from an external signal source, and outputs a second image signal with one of a plurality of fixed projection frame rates to the digital light processing chip according to the first image signal and one of the fixed projection frame rates supported by the projection system. The digital light processing chip drives the digital micromirror device according to the second image signal. The projection system and the projection method of the invention may realize a variable frame rate function and effectively improve smoothness of a projection image.

19 Claims, 4 Drawing Sheets

PROJECTION SYSTEM AND PROJECTION METHOD

CROSS-REFERENCE TO RELATED APPLICATION

This application claims the priority benefit of China application serial no. 202110954117.3, filed on Aug. 19, 2021. The entirety of the above-mentioned patent application is hereby incorporated by reference herein and made a part of this specification.

BACKGROUND

Technical Field

The invention relates to an image technology, and particularly relates to a projection system and a projection method.

Description of Related Art

Generally, since a wheel (a fluorescence wavelength conversion wheel or a filter wheel) used in collaboration with a projection optical engine in a projection system is driven by a constant-speed motor, a projection frame rate of the conventional projection system cannot be changed arbitrarily. In other words, when the conventional projection system receives an image signal with a variable frame rate (i.e., a non-fixed frame rate), since the projection frame rate of the conventional projection system is fixed, it often cause image stutter in a projection image due to that the frame rate of the image signal is asynchronous with the projection frame rate or has a non-integer frequency multiplication relationship with the projection frame rate.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a projection system and a projection method, which may achieve a variable frame rate (VRR) function, and effectively improve smoothness of projection images.

The invention provides a projection system including a digital micromirror device, a digital light processing chip, and a display processing chip. The digital light processing chip is coupled to the digital micromirror device. The display processing chip is coupled to the digital light processing chip. The display processing chip is configured to receive a first image signal with a variable frame rate from an external signal source, and output a second image signal with one of a plurality of fixed projection frame rates to the digital light processing chip according to the first image signal and one of the fixed projection frame rates supported by the projection system. The digital light processing chip drives the digital micromirror device according to the second image signal.

The invention provides a projection method including the following steps. A first image signal with a variable frame rate is received from an external signal source by a display processing chip. A second image signal with one of a plurality of fixed projection frame rates is output to a digital light processing chip by the display processing chip according to the first image signal and one of the fixed projection frame rates supported by a projection system. A digital micromirror device is driven by the digital light processing chip according to the second image signal.

Based on the above description, the projection system and the projection method of the invention may correspondingly adjust the projection frame rate according to the first image signal with a variable frame rate provided by the external signal source, so as to effectively reduce image stutter of the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
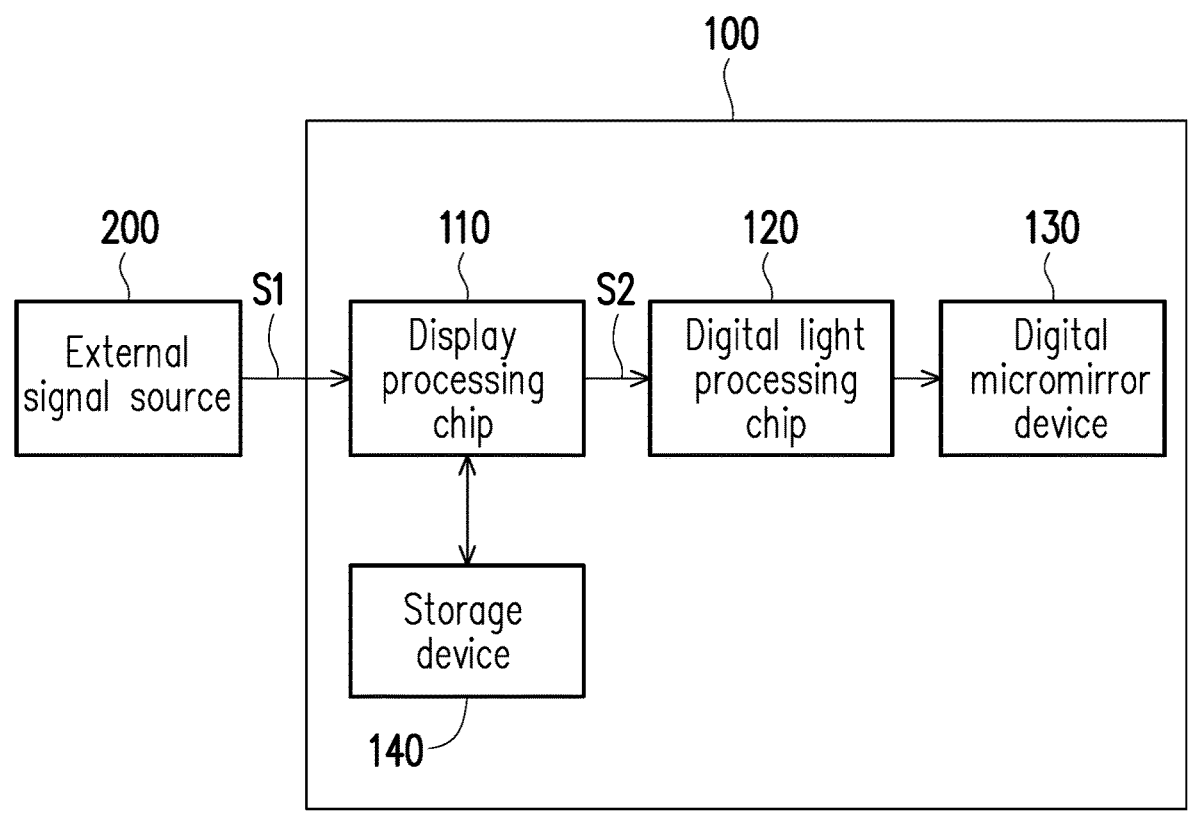
FIG. 1 is a schematic diagram of a projection system according to an embodiment of the invention.

FIG. 1 is a schematic diagram of a projection system according to an embodiment of the invention. Referring to FIG. 1, the projection system 100 includes a display processing chip 110, a digital light processing (DLP) chip 120, a digital micromirror device (DMD) 130 and a storage device 140. The display processing chip 110 is coupled to the digital light processing chip 120 and the storage device 140. In the embodiment, the display processing chip 110 may also be coupled to an external signal source 200 and may receive a first image signal S1 provided by the external signal source 200. The external signal source 200 may be, for example, an image signal providing device such as a personal computer (PC), a notebook computer, or a digital set-top-box (STB), etc., which is not limited by the invention. In the embodiment, the display processing chip 110 may sequentially draw a plurality of corresponding frame images according to the first image signal S1, and transmit a second image signal S2 of the sequentially output frame images to the DLP chip 120, so that the DLP chip 120 may drive the DMD 130 to perform a projection operation according to the second image signal S2.

In the embodiment, the display processing chip 110 may be a central processing unit (CPU) with image data processing and computing functions, or other programmable general-purpose or special-purpose microprocessor, a digital signal processor (DSP), an image processing unit (IPU), a graphics processing unit (GPU), a programmable controller, an application specific integrated circuit (ASIC), a programmable logic device (PLD), other similar processors, or a combination of these processors. In addition, the display processing chip 110 may include an image processing circuit and/or chip such as a video decoder, a zoom controller (scalar), etc.

In the embodiment, the DLP chip 120 is used for receiving the second image signal S2, i.e., used for receiving the signal of a fixed sampling rate of the projection system 100. The DLP chip 120 then drives the DMD 130 according to the signal with the fixed sampling rate. The invention does not limit the pattern and type of the DLP chip 120. In the embodiment, the DMD 130 is any reflective light modulator, which is not limited by the invention. The DMD 130 is used to convert an illumination light beam (not shown in the figure) of the projection system 100 into an image light beam (not shown in the figure) to project a projection image corresponding to the frame image, detailed steps and implementation methods thereof may be learned based on sufficient teachings, suggestions, and implementation descriptions of common knowledge in the field, which will not be repeated.

In the embodiment, the storage device 140 may include, for example, a flash memory and a non-volatile random access memory (NVRAM). The NVRAM (not shown in the figure) of the storage device 140 may be used to store extended display identification data (EDID) of the projection system 100. The EDID includes variable frame rate information. The display processing chip 110 uses the variable frame rate information in the storage device 140 to determine whether the first image signal S1 has a non-fixed frame rate and whether the type of the first image signal S1 is a preset supportable type in the projection system 100, so as to determine whether the display processing chip 110 enables a variable frame rate function. The flash memory (not shown in the figure) of the storage device 140 may be used to store image data of the first image signal S1 input by the external signal source 200 for the display processing chip 110 to access. The storage device 140 may further store information related to operations, image processing, and/or control modules for the display processing chip 110 and the DLP chip 120 to access and execute to implement the related projection operation described in the embodiments of the invention.

Figure 2:
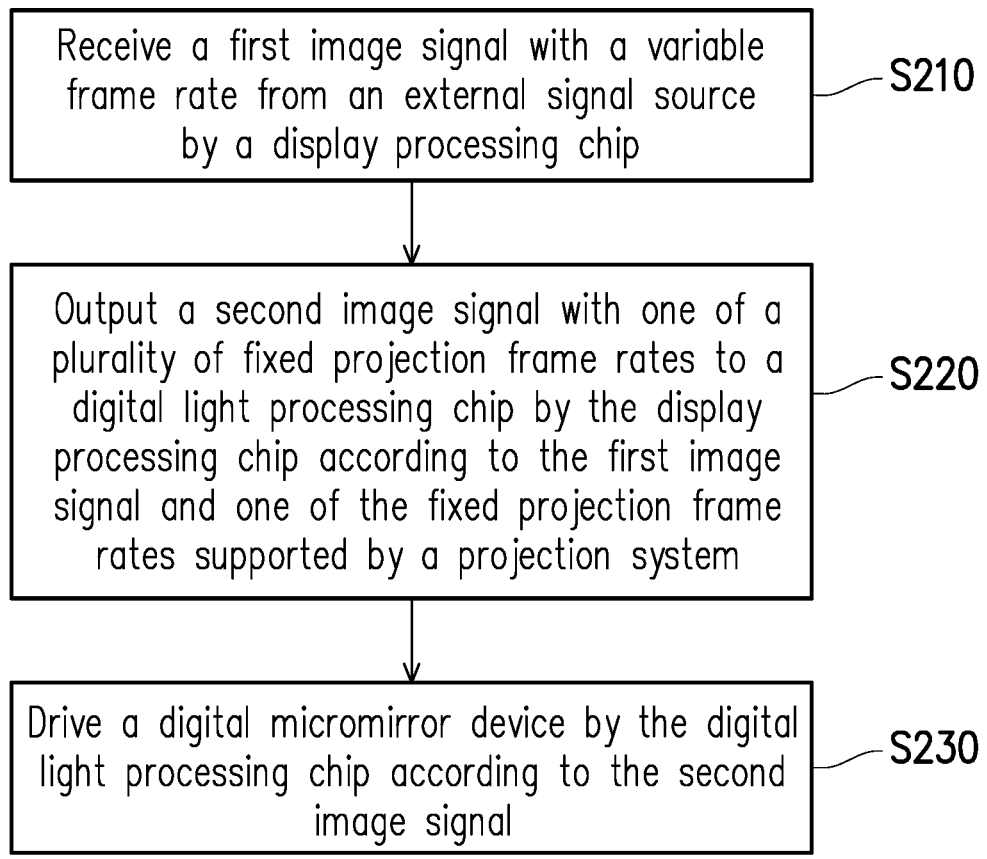
FIG. 2 is a flowchart illustrating a projection method according to an embodiment of the invention.
Figure 3:
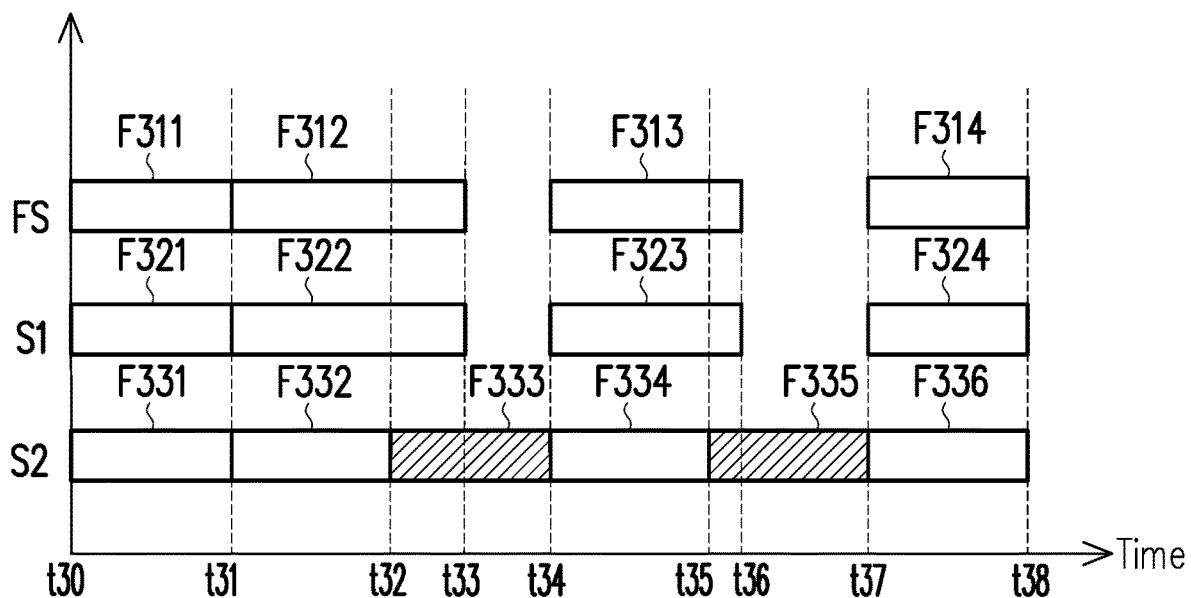
FIG. 3 is a schematic diagram of image signals according to an embodiment of the invention.

FIG. 2 is a flowchart illustrating a projection method according to an embodiment of the invention. FIG. 3 is a schematic diagram of image signals according to an embodiment of the invention. Referring to FIG. 1, FIG. 2 and FIG. 3, the projection system 100 may perform following steps S210 to S230 to realize a projection operation, and the following description is made with reference of the example of FIG. 3. Shown as a processing timing of a frame image signal FS in FIG. 3, a time length required for the external signal source 200 to process and output a frame image F311 is, for example, time t30 to time t31. A time length required for the external signal source 200 to process and output a frame image F312 is, for example, time t31 to time t33. A time length required for the external signal source 200 to process and output a frame image F313 is, for example, time t34 to time t36. A time length required for the external signal source 200 to process and output a frame image F314 is, for example, time t37 to time t38. In this regard, the external signal source 200 may sequentially output the frame images F311-F314 to the display processing chip 110.

According to another embodiment of the invention, the display processing chip 110 may output a synchronization signal to the external signal source 200, and the external signal source 200 provides the first image signal S1 with a variable frame rate to the display processing chip 110 according to the synchronization signal. Therefore, in step S210, the projection system 100 may receive the first image signal S1 with the variable frame rate (VRR) from the external signal source 200 through the display processing chip 110. Shown as a timing of the first image signal S1 in FIG. 3, the display processing chip 110 may sequentially receive a plurality of frame images F321 to F324 during a plurality of periods between time t30 and time t38. It should be noted that at least a part of the frame images F321 to F324 may have different frame rates.

In step S220, the projection system 100 may use the display processing chip 110 to output the second image signal S2 with one of a plurality of fixed projection frame rates to the DLP chip 120 according to the first image signal S1 and one of the fixed projection frame rates supported by the projection system 100. In the embodiment, the display processing chip 110 may decode the first image signal S1 to obtain image data of the plurality of frame images F321 to F324. The display processing chip 110 may temporarily store the image data of the frame images F321 to F324 of the first image signal S1 in the storage device 140 of the projection system 100. In this regard, the display processing chip 110 may output the second image signal S2 to the DLP chip 120 according to one of a plurality of fixed projection frame rates supported by the projection system 100. In addition, since a wheel (a fluorescence wavelength conversion wheel or a filter wheel) (not shown in the figure) in the projection system 100 is driven by a constant-speed motor, the projection system 100 supports a plurality of specific fixed projection frame rates. It should be noted that in order to reduce the number of image stutters, the display processing chip 110 may select one of a plurality of fixed projection frame rates as a current fixed projection frame rate, which may have higher synchronization with the plurality of frame images F321-F324 of the first image signal S1 to facilitate sampling.

For example, shown as the timing of the first image signal S1 in FIG. 3, the frame image F321 and the frame image F324 correspond to the same frame rate, while the frame image F322 and the frame image F323 have different frame rates from other frame images. Therefore, the display processing chip 110 may select the current fixed projection frame rate that is the same as the frame rate of the frame image F321 and the frame image F324 for sampling. Comparing the timings of the first image signal S1 and the second image signal S2 shown in FIG. 3, a frame image F331 and a frame image F336 of the second image signal S2 may respectively sample the frame image F321 and the frame image F324 of the first image signal S1, and the frame rate of the second image signal S2 may be synchronized with the frame rates of the frame image F321 and the frame image F324 of the first image signal S1. Since the frame rate of the second image signal S2 is not synchronized with the frame rates of the frame image F322 and the frame image F323 of the first image signal S1, a frame image F332 and a frame image F333 of the second image signal S2 may repeatedly sample the frame image F322 of the first image signal S1, and a frame image F334 and a frame image F335 of the second image signal S2 may repeatedly sample the frame image F323 of the first image signal S1. In this regard, the frame rates of the frame image F322 and the frame image F323 of the first image signal S1 are lower than the frame rate of the second image signal S2.

In other words, the number of the frame images F331 to F336 of the second image signal S2 is greater than the number of the frame images F321 to F324 of the first image signal S1. In addition, when the display processing chip 110 determines that the frame rate of at least one of the plurality of frame images of the first image signal S1 is not synchronized with (or has a non-integer frequency multiplication relationship with) the current fixed projection frame rate of the projection system 100, the processing chip 110 may repeatedly sample at least one of the plurality of frame images of the first image signal S1 to generate a plurality of the same corresponding second frame images in the second image signal S2.

In step S230, the projection system 100 may use the DLP chip 120 to drive the DMD 130 according to the second image signal S2. As shown in FIG. 3, since the frame rate of the second image signal S2 is not synchronized with the frame rates of the frame image F322 and the frame image F323 of the first image signal S1, the frame image F333 and the frame image F335 of the second image signal S2 are the results of repeatedly sampling the frame image F322 and the frame image F323, respectively. In this regard, in the process of projecting projection images of the frame image F333 and the frame image F335 by the DMD 130, two image stutter periods occur during the two periods from time t33 to time t34 and from time t36 to time t37, where a respective time length of each image stutter period is less than one frame image input time length of each frame image of the second image signal S2 (for example, the time length from time t33 to time t34 is less than the time length from time t32 to time t34). However, since the frame rate of the second image signal S2 is synchronized with the frame rates of the frame image F321 and the frame image F324 of the first image signal S1, during the process that the DMD 130 projects the projection images of the frame image F331 and the frame image F336, no image stutter occurs. Therefore, the projection system 100 of the embodiment may effectively reduce the image stutter of the projection image projected by the DMD 130.

Figure 4:
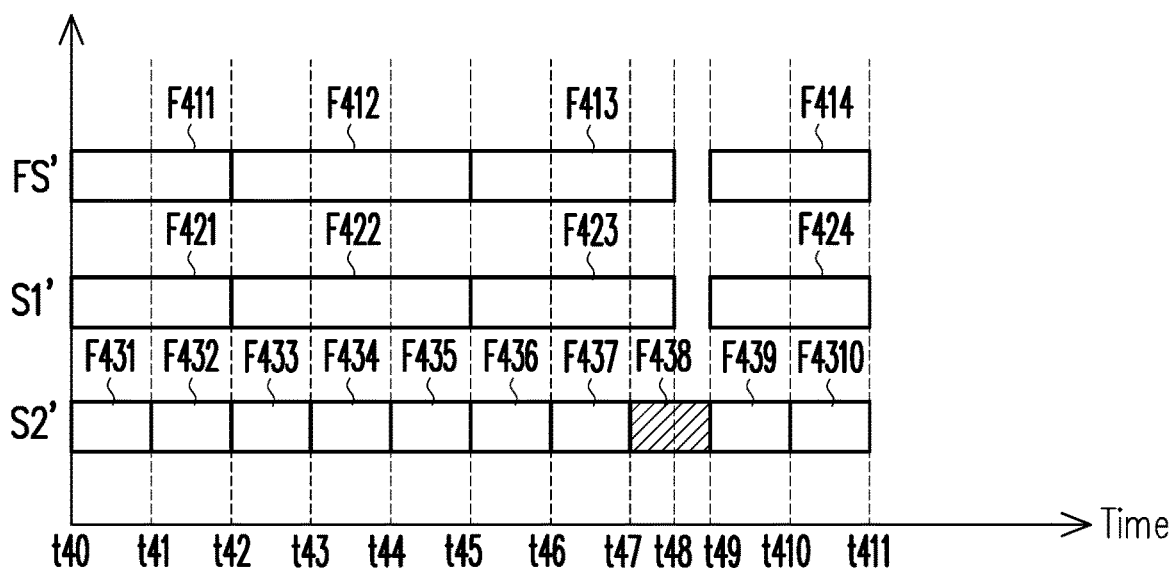
FIG. 4 is a schematic diagram of image signals according to another embodiment of the invention.

FIG. 4 is a schematic diagram of image signals according to another embodiment of the invention. Referring to FIG. 1 and FIG. 4, a processing timing of a frame image signal FS' shown in FIG. 4 is first introduced, a time length required for the external signal source 200 to process and output a frame image F411 is, for example, time t40 to time t42. A time length required for the external signal source 200 to process and output a frame image F412 is, for example, time t42 to time t45. A time length required for the external signal source 200 to process and output a frame image F413 is, for example, time t45 to time t48. A time length required for the external signal source 200 to process and output a frame image F414 is, for example, time t49 to time t411. In this regard, the external signal source 200 may sequentially output the frame images F411 to F414 to the display processing chip 110. Therefore, shown as the timing of the first image signal S1' shown in FIG. 4, the display processing chip 110 may sequentially receive the frame images F421 to F424 in a plurality of periods between time t40 and time t411.

It should be noted that the display processing chip 110 may output the second image signal S2' with the highest fixed projection frame rate to the DLP chip 120 according to the first image signal S1' and the highest fixed projection frame rate supported by the projection system 100. For example, shown as the timing of the first image signal S1' in FIG. 4, the frame rates of the frame image F421 and the frame image F424 are the same, and the frame rates of the frame image F422 and the frame image F423 are respectively different from that of other frame images. The display processing chip 110 may select the highest fixed projection frame rate supported by the projection system 100 for sampling. In addition, the fixed projection frame rate of the second image signal S2' is higher than a maximum frame rate in a variable frame rate range of the first image signal S1'. As shown in FIG. 4, the fixed projection frame rate of the second image signal S2' may be, for example, twice of the frame rate of the frame image F421 and the frame image F424 of the first image signal S1'.

Comparing the timings of the first image signal S1' and the second image signal S2' shown in FIG. 4, the frame image F431 and the frame image F432 of the second image signal S2' may repeatedly sample the frame image F421 of the first image signal S1'. The frame images F433 to F435 of the second image signal S2' may repeatedly sample the frame image F422 of the first image signal S1'. The frame images F436 to F438 of the second image signal S2' may repeatedly sample the frame image F423 of the first image signal S1'. The frame image F439 and the frame image F4310 of the second image signal S2' may repeatedly sample the frame image F424 of the first image signal S1'. It should be noted that the frame rates of the frame images F421, F422, and F424 of the first image signal S1' are integer multiples of the frame rate of the second image signal S2', so that although the second image signal S2' performs repeated sampling on the plurality of corresponding frame images, no image stutter will occur in the frame images F431-F437, F439, and F4310. In addition, since the frame rate of the second image signal S2' only has a non-integer frequency multiplication relationship with the frame rate of the frame image F423 of the first image signal S1', during the process that the DMD 130 projects a projection image of the frame image F438, only one image stutter period occurs during the period from time t48 to time t49, where a time length of the image stutter period is less than one frame image input time length of each frame image of the second image signal S2' (for example, the time length from time t48 to time t49 is less than the time length from time t47 to time t49). In other words, at least one of a stutter time length and a number of stutters between the frame images F421-F424 of the first image signal S1' and the frame images F431-F4310 of the second image signal S2' is negatively correlated with the current fixed projection frame rate of the projection system 100. Therefore, the projection system 100 of the embodiment may implement the projection operation of the DMD 130 by directly operating the highest fixed projection frame rate supported by the projection system 100, which may effectively reduce the image stutter phenomenon of the projection image.

Figure 5:
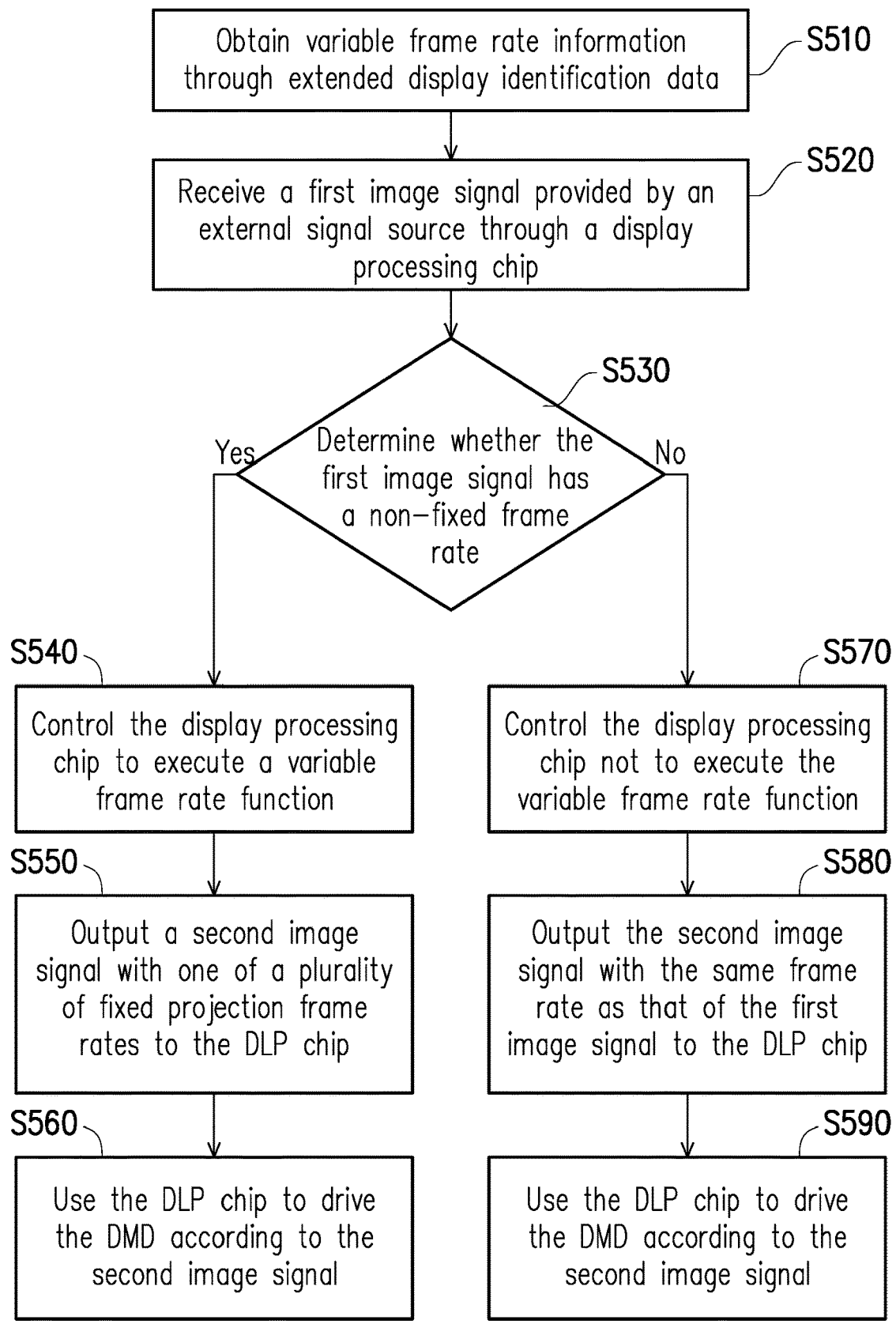
FIG. 5 is a flowchart of a projection method according to another embodiment of the invention.

FIG. 5 is a flowchart of a projection method according to another embodiment of the invention. Referring to FIG. 1 and FIG. 5, the projection system 100 may perform the following steps S510 to S590 to implement the projection operation. In step S510, the display processing chip 110 obtains variable frame rate information through the extended display identification data (EDID) of the projection system 100. In step S520, the projection system 100 receives the first image signal S1 provided by the external signal source 200 through the display processing chip 110. In step S530, the display processing chip 110 determines whether the first image signal S1 has a non-fixed frame rate. In other words, when the external signal source 200 has a variable frame rate function, and may output a plurality of frame images with a non-fixed frame rate to the display processing chip 110 according to the variable frame rate information declared by the EDID of the projection system 100, it represents that the first image signal S1 has a non-fixed frame rate. Conversely, when the external signal source 200 outputs a plurality of frame images with a fixed frame rate to the display processing chip 110, it represents that the first image signal S1 does not have a non-fixed frame rate.

Therefore, if the display processing chip 110 determines that the first image signal S1 has a non-fixed frame rate, in step S540, the projection system 100 controls the display processing chip 110 to execute the variable frame rate function. In step S550, the display processing chip 110 outputs a second image signal S2 with one of a plurality of fixed projection frame rates supported by the projection system 100 to the DLP chip 120. In step S560, the projection system 100 may use the DLP chip 120 to drive the DMD 130 according to the second image signal S2. However, if the display processing chip 110 determines that the first image signal S1 does not have a non-fixed frame rate, in step S570, the projection system 100 controls the display processing chip 110 not to execute the variable frame rate function. In step S580, the display processing chip 110 may output the second image signal S2 with the same frame rate as that of the first image signal S1 to the DLP chip 120. Alternatively, in an embodiment, the display processing chip 110 may output the second image signal S2 with a preset projection frame rate supported by the projection system 100 to the DLP chip 120. In step S590, the projection system 100 may use the DLP chip 120 to drive the DMD 130 according to the second image signal S2. Therefore, the projection system 100 of the embodiment may automatically determine the frame rate of the first image signal S1, and accordingly activate the variable frame rate function, so as to effectively reduce the image stutter phenomenon of the projection image projected by the DMD 130.

In addition, technical details of the variable frame rate function of the embodiment and related implementation methods thereof may be deduced by referring to the descriptions of the embodiments of FIG. 1 to FIG. 4 to obtain enough instructions, suggestions and implementation explanations, and details thereof are not repeated.

Moreover, it should be noted that in FIG. 3 and FIG. 4 of the above embodiment, since during the process that the external signal source 200 sends a signal, the display processing chip 110 receives the first image signal S1 and generates the second image signal S2, additional signal transmission and signal processing time are respectively required, the timing relationship of the multiple frame images in FIG. 3 and FIG. 4 in the above embodiment is not an actual signal input and output timing, which is only used to express the corresponding relationship between the image signals and comparison of the corresponding time lengths.

In summary, the projection system and projection method of the invention may use the display processing chip of the projection system to execute the variable frame rate function according to the frame rate of the first image signal provided by the external signal source and the plurality of fixed projection frame rates supported by the projection system, so as to appropriately adjust the frame rate of the second image signal to be provided to the DLP chip. Therefore, the projection system and the projection method of the invention may effectively reduce the image stutter phenomenon of the projection image projected by the DMD.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system, comprising:
a digital micromirror device;
a digital light processing chip, coupled to the digital micromirror device; and
a display processing chip, coupled to the digital light processing chip and configured to receive a first image signal with a variable frame rate from an external signal source, and output a second image signal with one of a plurality of fixed projection frame rates to the digital light processing chip according to the first image signal and one of the plurality of fixed projection frame rates supported by the projection system,
wherein the digital light processing chip drives the digital micromirror device according to the second image signal, wherein the display processing chip obtains variable frame rate information through extended display identification data of the projection system.

2. The projection system as claimed in claim 1, wherein the fixed projection frame rate of the second image signal is higher than a maximum frame rate of a variable frame rate range of the first image signal.

3. The projection system as claimed in claim 1, wherein the display processing chip outputs the second image signal with a highest fixed projection frame rate to the digital light processing chip according to the first image signal and the highest fixed projection frame rate supported by the projection system.

4. The projection system as claimed in claim 1, wherein the first image signal comprises a plurality of first frame images, and the second image signal comprises a plurality of second frame images, wherein a number of the plurality of second frame images is greater than a number of the plurality of first frame images.

5. The projection system as claimed in claim 4, wherein when the display processing chip determines that a frame rate of at least one of the plurality of first frame images is not synchronized with a current fixed projection frame rate of the projection system, the display processing chip repeatedly samples at least one of the plurality of first frame images to generate a plurality of same corresponding second frame images.

6. The projection system as claimed in claim 4, wherein a time length of one image stutter period of a projection image projected by the digital micromirror device is less than one frame image input time length of the plurality of second frame images.

7. The projection system as claimed in claim 4, wherein at least one of a stutter time length and a number of stutters between the plurality of first frame images and the plurality of second frame images is negatively correlated with a current fixed projection frame rate of the projection system.

8. The projection system as claimed in claim 1, wherein the display processing chip outputs a synchronization signal to the external signal source, and the external signal source provides the first image signal with the variable frame rate according to the synchronization signal.

9. The projection system as claimed in claim 1, wherein when the display processing chip receives the first image signal with the variable frame rate, the display processing chip executes a variable frame rate function, and outputs the second image signal with one of the plurality of fixed projection frame rates, when the display processing chip receives another first image signal with a non-variable frame rate, the display processing chip does not execute the variable frame rate function, and outputs another second image signal with a frame rate same as the frame rate of the another first image signal.

10. A projection method, comprising:
receiving a first image signal with a variable frame rate from an external signal source by a display processing chip;
outputting a second image signal with one of a plurality of fixed projection frame rates to a digital light processing chip by the display processing chip according to the first image signal and one of the plurality of fixed projection frame rates supported by a projection system; and
driving a digital micromirror device by the digital light processing chip according to the second image signal, wherein the display processing chip obtains variable frame rate information through extended display identification data of the projection system.

11. The projection method as claimed in claim 10, wherein the fixed projection frame rate of the second image signal is higher than a maximum frame rate of a variable frame rate range of the first image signal.

12. The projection method as claimed in claim 10, wherein the step of outputting the second image signal to the digital light processing chip comprises:
outputting the second image signal with a highest fixed projection frame rate to the digital light processing chip by the display processing chip according to the first image signal and the highest fixed projection frame rate supported by the projection system.

13. The projection method as claimed in claim 10, wherein the first image signal comprises a plurality of first frame images, and the second image signal comprises a plurality of second frame images, wherein a number of the plurality of second frame images is greater than a number of the plurality of first frame images.

14. The projection method as claimed in claim 13, wherein the step of outputting the second image signal to the digital light processing chip comprises:
when the display processing chip determines that a frame rate of at least one of the plurality of first frame images is not synchronized with a current fixed projection frame rate of the projection system, repeatedly sampling at least one of the plurality of first frame images by the display processing chip to generate a plurality of same corresponding second frame images.

15. The projection method as claimed in claim 13, wherein a time length of one image stutter period of a projection image projected by the digital micromirror device is less than one frame image input time length of the plurality of second frame images.

16. The projection method as claimed in claim 13, wherein at least one of a stutter time length and a number of stutters between the plurality of first frame images and the plurality of second frame images is negatively correlated with a current fixed projection frame rate of the projection system.

17. The projection method as claimed in claim 10, further comprising:
outputting a synchronization signal to the external signal source by the display processing chip, and providing the first image signal with the variable frame rate by the external signal source according to the synchronization signal.

18. The projection method as claimed in claim 10, further comprising:
when the display processing chip receives the first image signal with the variable frame rate, executing a variable frame rate function by the display processing chip, and outputting the second image signal with one of the plurality of fixed projection frame rates; and
when the display processing chip receives another first image signal with a non-variable frame rate, not executing the variable frame rate function by the display processing chip, and outputting another second image signal with a frame rate same as the frame rate of the another first image signal.

19. A projection system, comprising:
a digital micromirror device;
a digital light processing chip, coupled to the digital micromirror device; and a display processing chip, coupled to the digital light processing chip and configured to receive a first image signal with a variable frame rate from an external signal source, and output a second image signal with one of a plurality of fixed projection frame rates to the digital light processing chip according to the first image signal and one of the plurality of fixed projection frame rates supported by the projection system, wherein the digital light processing chip drives the digital micromirror device according to the second image signal, wherein when the display processing chip receives the first image signal with the variable frame rate, the display processing chip executes a variable frame rate function, and outputs the second image signal with one of the plurality of fixed projection frame rates, when the display processing chip receives another first image signal with a non-variable frame rate, the display processing chip does not execute the variable frame rate function, and outputs another second image signal with a frame rate same as the frame rate of the another first image signal.

\* \* \* \* \*